(12) United States Patent
Wu (10) Patent No.: US 8,509,795 B2
(45) Date of Patent: Aug. 13, 2013

(54) METHOD OF PERFORMING DATA TRANSMISSION CORRESPONDING TO SEMI-PERSISTENT RESOURCES IN WIRELESS COMMUNICATIONS SYSTEM AND RELATED DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 425 days.

(21) Appl. No.: 12/559,511

(22) Filed: Sep. 15, 2009

(65) Prior Publication Data
US 2010/0075690 A1    Mar. 25, 2010

Related U.S. Application Data

(60) Provisional application No. 61/098,800, filed on Sep. 22, 2008.

(51) Int. Cl.
*H04W 72/00* (2009.01)

(52) U.S. Cl.
USPC ........................................ 455/452.1; 370/342

(58) Field of Classification Search
USPC ............................... 455/452.1; 370/329, 336
See application file for complete search history.

(56) References Cited

U.S. PATENT DOCUMENTS

| 2008/0117891 | A1 | 5/2008 | Damnjanovic |
| 2008/0310333 | A1* | 12/2008 | Balachandran et al. ...... 370/310 |
| 2009/0073907 | A1* | 3/2009 | Cai .............................. 370/311 |
| 2011/0182245 | A1* | 7/2011 | Malkamaki et al. .......... 370/329 |

FOREIGN PATENT DOCUMENTS
TW    200818826    4/2008

OTHER PUBLICATIONS

3GPP TS 36.300 V8.6.0 Evolved Universal Terrestrial Radio Access (E-UTRA) and Evolved Universal Terrestrial Radio Access Network (E-UTRAN); Overall description, Sep. 2008.
Philips: "Mitigating effect of false positive uplink grants", 3GPP TSG RAN WG1 Meeting #54, R1-082792, Aug. 18-22, 2008, XP050316284, Jeju, Korea.
Philips: "Mitigating effect of false positive uplink grants", 3GPP TSG RAN WG2 Meeting #63, R2-084718 (update of R2-084086), Aug. 18-22, 2008, XP050319688, Jeju, Korea.
Nokia Corporation, Nokia Siemens Networks: "Semi-Persistent Scheduling", 3GPP TSG-RAN2 Meeting #63, R2-084737, Aug. 18-22, 2008, XP050319706, Jeju,Korea.
Ericsson: "Handling of Semi-Persistent Assignments and Grants", 3GPP TSG-RAN2 Meeting #63, R2-083896, Aug. 18-23, 2008, XP050319088, Jeju Island,Korea.
HTC Corporation: "Clarification on Semi-Persistent Scheduling", 3GPP TSG-RAN2 Meeting #63bis, R2-085200, Sep. 29-Oct. 3, 2008, XP050320106, Prague, Czech.

(Continued)

*Primary Examiner* — Marcos Batista
(74) *Attorney, Agent, or Firm* — Winston Hsu; Scott Margo (57) ABSTRACT

A method of performing data transmission corresponding to semi-persistent resources for a user equipment of a wireless communication system includes performing a data transmission process corresponding to a communications link according to a semi-persistent grant in a transmission opportunity of the semi-persistent grant when no non-semi-persistent grant is found on a physical channel for the transmission opportunity of the semi-persistent grant, where the semi-persistent grant and the non-semi-persistent grant correspond to the communications link.

17 Claims, 6 Drawing Sheets

(56) References Cited

OTHER PUBLICATIONS

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.5.0 Release 8)," ETSI TS 136 300 V8.5.0 (Jul. 2008), front page + pp. 1-137, XP014042193, European Telecommunications Standards Institute (ETSI), Sophia Antipolis Cedex, France.

Dajie Jiang et al.:"Principle and Performance of Semi-Persistent Scheduling for VoIP in LTE System", pp. 2861-2864, 2007,XP031261882, IEEE, NJ,USA.

European patent application No. 11007841.7, European Search Report mailing date: Nov. 23, 2011.

Email Rapporteur, "Summary of the email discussion on remaining issues on Semi Persistent Scheduling", 3GPP TSG-RAN WG2 #63, Tdoc R2-083900, Aug. 18-22, 2008, Jeju, Korea, XP050319091, p. 1-5.

ZTE, "SPS and HARQ retransmissions", 3GPP TSG-RAN2 Meeting #64, R2-086147, Nov. 10-14, 2008, Prague, Czech Republic, XP050320933, p. 1-5.

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.2.0 (May 2008), p. 13-14.

Office action mailed on Oct. 12, 2012 for the Taiwan application No. 098131899, filing date Sep. 22, 2009, p. 1-5.

* cited by examiner

METHOD OF PERFORMING DATA TRANSMISSION CORRESPONDING TO SEMI-PERSISTENT RESOURCES IN WIRELESS COMMUNICATIONS SYSTEM AND RELATED DEVICE

CROSS REFERENCE TO RELATED APPLICATIONS

This application claims the benefit of U.S. Provisional Application No. 61/098,800, filed on Sep. 22, 2008 and entitled "METHOD AND RELATED DEVICE FOR DATA TRANSMISSION AND RECEPTION WHEN SEMI-PERSISTENT RESOURCE IS CONFIGURED IN WIRELESS COMMUNICATIONS SYSTEM" the contents of which are incorporated herein.

BACKGROUND OF THE INVENTION

1. Field of the Invention

The present invention relates to a method and related communication device utilized in a wireless communications system and more particular to a method and related communication device of performing data transmission corresponding to semi-persistent resources.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The E-UTRAN and the eNBs are seen as part of the network side.

Semi-persistent scheduling (SPS) is introduced to the LTE system for both uplink and downlink scheduling for reducing overhead of control information sent on a physical downlink control channel (PDCCH). Take downlink transmission for example. When semi-persistent downlink resources are configured, the UE is allowed to periodically receive data block sent on a downlink shared channel (DSCH) without the control information of the PDCCH that shall be sent by the network. The period is configured by a certain amount of subframes.

The control information involved with SPS includes a C-RNTI (cell radio network temporary identifier) and an SPS C-RNTI. As well known, the C-RNTI provides the UE with a unique UE identification at the cell level identifying RRC (radio resource control) Connection and used for scheduling. The SPS C-RNTI is a UE specific identity assigned by RRC for activation or modification of semi-persistent resources. The E-UTRAN activates or modifies the semi-persistent resources by sending the SPS C-RNTI and a NDI (New Data Indicator)=0 on the PDCCH. Resource assignment for retransmission is addressed by the SPS C-RNTI and the NDI=1 on the PDCCH.

The related semi-persistent downlink scheduling operation of the UE is described below. (1) In the sub-frames where the UE has semi-persistent downlink resources, if the UE cannot find its C-RNTI on the PDCCH(s), a downlink transmission according to the semi-persistent allocation that the UE has been assigned in a TTI (Transmission Time Interval) is assumed. (2) Otherwise, in the sub-frames where the UE has the semi-persistent downlink resources, if the UE finds its C-RNTI on the PDCCH(s), the PDCCH allocation overrides the semi-persistent allocation for that TTI, and the UE does not decode the semi-persistent resources.

The related semi-persistent uplink scheduling operation of the UE is described below. (3) In the sub-frames where the UE has semi-persistent uplink resources, if the UE cannot find its C-RNTI on the PDCCH(s), an uplink transmission according to the semi-persistent allocation that the UE has been assigned in the TTI can be made. (4) Otherwise, in the sub-frames where the UE has semi-persistent uplink resource, if the UE finds its C-RNTI on the PDCCH(s), the PDCCH allocation overrides the persistent allocation for that TTI, and the transmission of the UE follows the PDCCH allocation instead of the semi-persistent allocation. (5) Retransmissions are either implicitly allocated in which case the UE uses the semi-persistent uplink allocation, or explicitly allocated via PDCCH(s) in which case the UE does not follow the semi-persistent allocation.

For uplink and downlink, the UE determines whether to use PDCCH allocation or semi-persistent allocation only according to the C-RNTI sent on PDCCH. However, the C-RNTI is unable to indicate the UE that an uplink or a downlink grant is accompanied. C-RNTI allocation without the related grant allocation can cause radio resource misusing in related sub-frames, thereby degrading system performance.

In addition, an SI-RNTI (System Information RNTI) indicating existence of broadcast system information may be allocated and overlapped the C-RNTI. Therefore, the following issues are found according to the abovementioned downlink and uplink scheduling operations.

Issue 1 is described in this paragraph. In a sub-frame where a UE 1 has semi-persistent downlink resources, if an eNB allocates this sub-frame to another UE (UE 2) for dynamic scheduling, the UE 1 cannot find its C-RNTI but still decodes this sub-frame with semi-persistent allocation. However, the UE 1 cannot decode it successfully according to (1) and thereby reports a NACK (negative acknowledgement) to the eNB. This makes interference to UE 2 transmission for ACKs (positive acknowledgements) or NACKs.

Issue 2 is described in this paragraph. In a sub-frame where a UE has semi-persistent downlink resources, if an eNB allocates this sub-frame to transmit system information, the UE cannot find its C-RNTI but finds an SI-RNTI. However, the UE still decodes this sub-frame with semi-persistent allocation according to (1). Therefore, the UE cannot decode the system information successfully.

Issue 3 is described in this paragraph. In a sub-frame where a UE has semi-persistent downlink resources, if the UE finds its C-RNTI on PDCCH(s) for uplink resource assignment for dynamic scheduling, the UE does not decode the semi-persistent resources and try to decode the PDSCH with the PDCCH allocation according to (2). However, the PDCCH allocation is used for uplink dynamic scheduling resources.

Issue 4 is described in this paragraph. In a sub-frame where a UE 1 has semi-persistent uplink resources, if an eNB allocates this sub-frame to another UE (UE 2) for dynamic scheduling, the UE 1 cannot find its C-RNTI but still transmits uplink data with the semi-persistent allocation according to (3). This makes interference to UE 2 data transmission.

Issue 5 is described in this paragraph. In a sub-frame where a UE has semi-persistent uplink resources, if the UE finds its C-RNTI on PDCCH(s) for downlink resource assignment for dynamic scheduling, the UE transmission follows the PDCCH allocation according to (4). However, the PDCCH allocation is for downlink dynamic scheduling resources.

Issue 6 is described in this paragraph. In a sub-frame where a UE 1 has semi-persistent uplink resources for retransmission, if an eNB allocates this sub-frame to a UE 2 for dynamic scheduling, the UE 1 cannot find its C-RNTI but still transmits uplink data with the semi-persistent allocation for retransmission according to (5). This makes interference to UE 2 data transmission.

SUMMARY OF THE INVENTION

The present invention therefore provides a method of performing data transmission corresponding to semi-persistent resources for a UE of a wireless communication system and related communication device to solve the abovementioned problems.

According to an embodiment of the present invention, a disclosed method of performing data transmission corresponding to semi-persistent resources for a user equipment of a wireless communication system includes performing a data transmission process corresponding to a communications link according to a semi-persistent grant in a transmission opportunity of the semi-persistent grant when no non-semi-persistent grant is found on a physical channel for the transmission opportunity of the semi-persistent grant, where the semi-persistent grant and the non-semi-persistent grant correspond to the communications link.

According to an embodiment of the present invention, a communication device of a wireless communication system for accurately performing data transmission corresponding to semi-persistent resources is disclosed and includes a computer readable recording medium and a processor. The computer readable recording medium is used for storing program code corresponding to a process. The processor is coupled to the computer readable recording medium and used for processing the program code to execute the process. The process includes performing a data transmission process corresponding to a communications link according to a semi-persistent grant in a transmission opportunity of the semi-persistent grant when no non-semi-persistent grant is found on a physical channel for the transmission opportunity of the semi-persistent grant, where the semi-persistent grant and the non-semi-persistent grant correspond to the communications link.

According to another embodiment of the present invention, a method of performing data transmission corresponding to semi-persistent resources for a user equipment of a wireless communication system includes performing a data transmission process corresponding to a first communications link according to a semi-persistent grant corresponding to the first communications link in a transmission opportunity of the semi-persistent grant when a non-semi-persistent grant corresponding to a second communications link and a cell identifier of the user equipment are found on a physical channel for the transmission opportunity of the semi-persistent grant.

According to an embodiment of the present invention, a communication device of a wireless communication system for accurately performing data transmission corresponding to semi-persistent resources is disclosed and includes a computer readable recording medium and a processor. The computer readable recording medium is used for storing program code corresponding to a process. The processor is coupled to the computer readable recording medium and used for processing the program code to execute the process. The process includes performing a data transmission process corresponding to a first communications link according to a semi-persistent grant corresponding to the first communications link in a transmission opportunity of the semi-persistent grant when a non-semi-persistent grant corresponding to a second communications link and a cell identifier of the communication device are found on a physical channel for the transmission opportunity of the semi-persistent grant.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
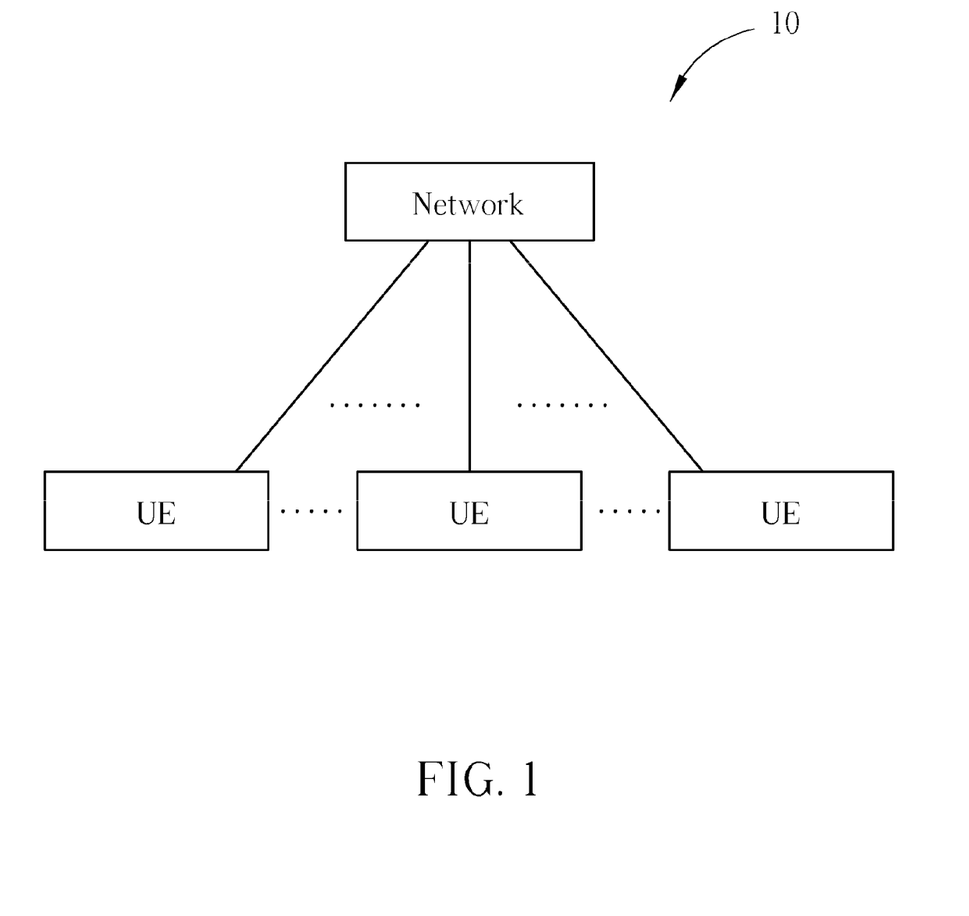
FIG. 1 is a schematic diagram of a wireless communication system.

Please refer to FIG. 1, which illustrates a schematic diagram of a wireless communication system 10 according to an embodiment of the present invention. The wireless communication system 10 is an LTE (long-term evolution) system or other mobile communication systems, and is briefly composed of a network and a plurality of UEs. In FIG. 1, the network and the UEs are simply utilized for illustrating the structure of the wireless communication system 10. Practically, a EUTRAN (evolved-UTAN), part of a network, comprises a plurality of evolved base stations (eNBs). The UEs can be devices such as mobile phones, computer systems, etc. Besides, two different communications links are defined between the network and the UE. One communications link is a downlink where the network and the UE act as a transmitter or a receiver respectively. The other communications link is an uplink where the UE and the network act as a transmitter or a receiver respectively.

Figure 2:
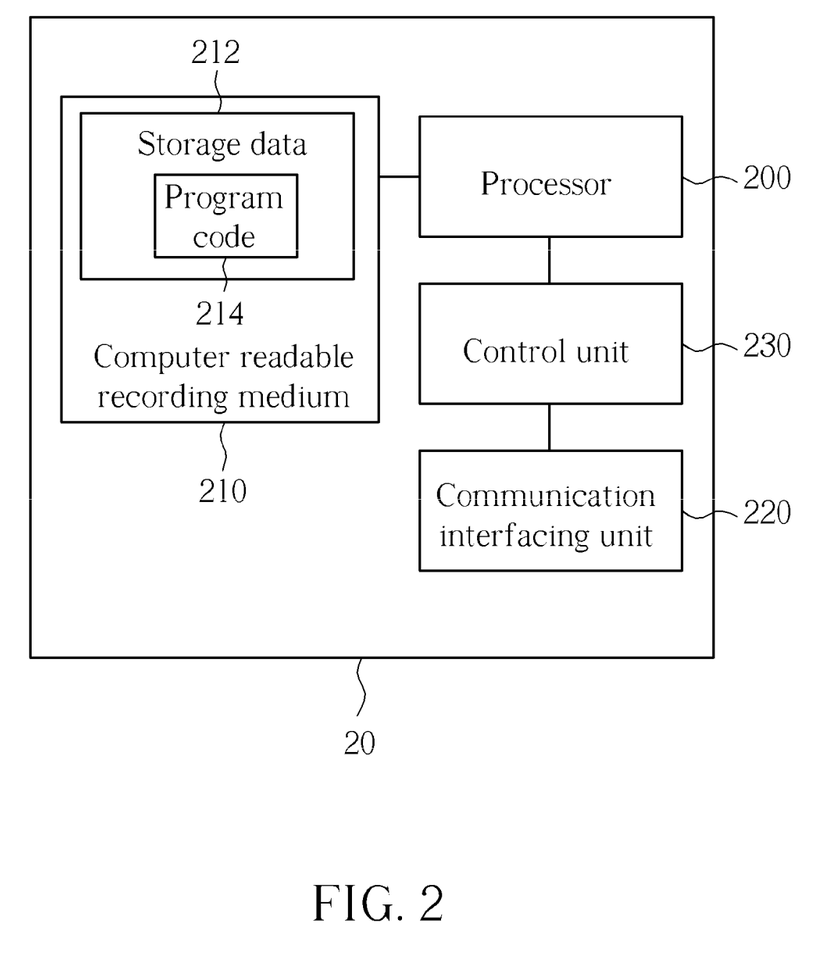
FIG. 2 is a schematic diagram of a communication device according to an embodiment of the present invention.

Please refer to FIG. 2, which illustrates a schematic diagram of a communication device 20 according to embodiments of the present invention. The communication device 20 includes a processor 200, a computer readable recording medium 210, a communication interfacing unit 220 and a control unit 230. The computer readable recording medium 210 is any data storage device that stores storage data 212 thereafter read and processed by the processor 200. The stores storage data 212 includes program code 214 corresponding to a process for performing data transmission corresponding to semi-persistent resources. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver for wirelessly communicating with other communication devices.

The communication device 20 can be the UEs in FIG. 1 and supports a semi-persistent scheduling (SPS) function including use of a semi-persistent uplink grant or a semi-persistent downlink grant. The communication device 20 is capable of receiving a downlink grant, an uplink grant, a semi-persistent downlink grant, a semi-persistent uplink grant, a cell identifier, an SPS cell identifier, or a system information identifier from the network by monitoring a physical channel. The downlink and uplink grants are regarded as non-semi-persistent downlink and uplink grants respectively. The cell identifier provides the communication device 20 with a unique identification at a cell level. The system information identifier indicates the communication device 20 of existence of broadcast system information.

When the communication device 20 is used as the UE in the LTE system, the cell identifier may be a C-RNTI (cell radio network temporary identifier), the SPS cell identifier may be an SPS C-RNTI, the system information identifier may be an SI-RNTI (system information radio network temporary identifier), and the physical channel may be a physical downlink control channel (PDCCH).

Please note that downlink/uplink grant is used to play a role as non-semi-persistent grants. However, the non-semi-persistent grants of the present invention embodiments are not limited to the above and can be resource allocation configured on the PDCCH or by an upper layer, such as a RRC (Radio Resource Control) layer.

In the abovementioned situation, processes for performing data transmission corresponding to semi-persistent resources are accordingly provided to avoid resource misuse or transmission interference.

Figure 3:
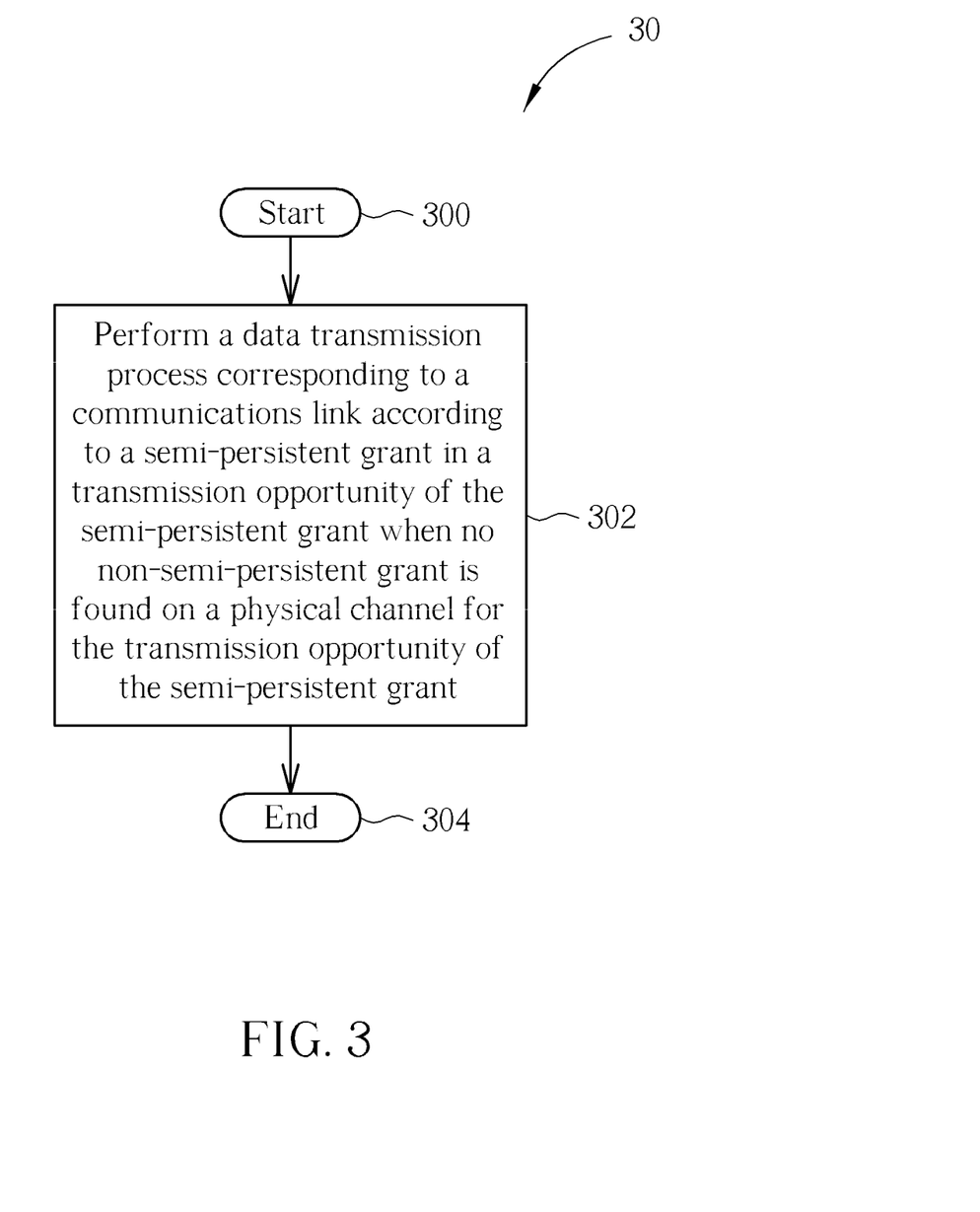
FIG. 3 is a flowchart of a process according to an embodiment of the present invention.

Please refer to FIG. 3, which illustrates a flowchart of a process 30 according to an embodiment of the present invention. The process 30 is utilized for performing data transmission corresponding to semi-persistent resources for a UE of a wireless communication system. The process 30 can be compiled into the program code 214 of the storage data 212 and includes the following steps:

Step 300: Start.

Step 302: Perform a data transmission process corresponding to a communications link according to a semi-persistent grant in a transmission opportunity of the semi-persistent grant when no non-semi-persistent grant is found on a physical channel for the transmission opportunity of the semi-persistent grant.

Step 304: End.

According to the process 30, the UE performs the data transmission process corresponding to the communications link (e.g. uplink or downlink) according to the semi-persistent grant in the transmission opportunity of the semi-persistent grant when the UE does not find any non-semi-persistent grant on the physical channel for the transmission opportunity. Therefore, the misuse of the semi-persistent function can be avoided.

In the process 30, the data transmission process, the semi-persistent grant, and the non-semi-persistent grant correspond to the same communications link, such as uplink or downlink. The physical channel may be the PDCCH; the non-semi-persistent grant is an uplink or downlink grant; the transmission opportunity may be a subframe or a TTI (Transmission Time Interval); the data transmission process related to downlink is receiving a data block; the data transmission process related to uplink is an uplink new transmission or a retransmission.

In this situation, when the UE cannot find the downlink grant on the PDCCH, a downlink transmission according to the semi-persistent allocation that the UE has been assigned in a TTI is assumed in the sub-frames where the UE has semi-persistent downlink resources. Similarly, when the UE cannot find the uplink grant on the PDCCH, an uplink transmission according to the semi-persistent allocation that the UE has been assigned in the TTI can be made in the sub-frames where the UE has semi-persistent uplink resources.

In addition to Step 302, the UE performs the data transmission process according to the semi-persistent grant in the transmission opportunity when none of a non-semi-persistent grant, a cell identifier (e.g. C-RNTI) of the UE, and a semi-persistent scheduling (SPS) cell identifier (e.g. SPS C-RNTI) of the UE is found on the physical channel for the transmission opportunity. The UE can further stop the data transmission process in the transmission opportunity when the non-semi-persistent grant whose frequency allocation collides with frequency allocation of the semi-persistent grant is found on the physical channel. Furthermore, the UE can detect the cell identifier of the UE and the SPS cell identifier of the UE on the physical channel for the transmission opportunity. In this situation, the UE stops the data transmission process in the transmission opportunity when the non-semi-persistent grant whose frequency allocation collides with frequency allocation of the semi-persistent grant is found on the physical channel and neither cell identifier nor SPS cell identifier is found on the physical channel for the transmission opportunity.

The process 30 can resolve the problems of the issue 1 (downlink case) of the prior art. In the sub-frame where the UE 1 has a semi-persistent downlink grant, if the eNB allocates this sub-frame to the UE 2 for dynamic scheduling, the UE 1 checks and finds a downlink grant and a C-RNTI that is not allocated to the UE 1 on the PDCCH. When the found downlink grant collides with the semi-persistent downlink grant in frequency allocation, the UE 1 stops receiving a data block in the sub-frame. Thus, the unsuccessful decoding and the following NACK transmission are avoided. A similar way to the above can also solve the issue 4 (uplink case) of the prior art.

The process 30 can resolve the problems of the issue 6 of the prior art. In the sub-frame where the UE 1 has a semi-persistent uplink grant for retransmission, when the eNB allocates this sub-frame to the UE 2 for dynamic scheduling, the UE 1 checks and finds an uplink grant and a C-RNTI that is not allocated to the UE 1. When the found uplink grant collides with the semi-persistent uplink grant in frequency allocation, the UE 1 stops any uplink retransmission in the sub-frame. Thus, the UE 2 data transmission is not interfered.

Figure 4:
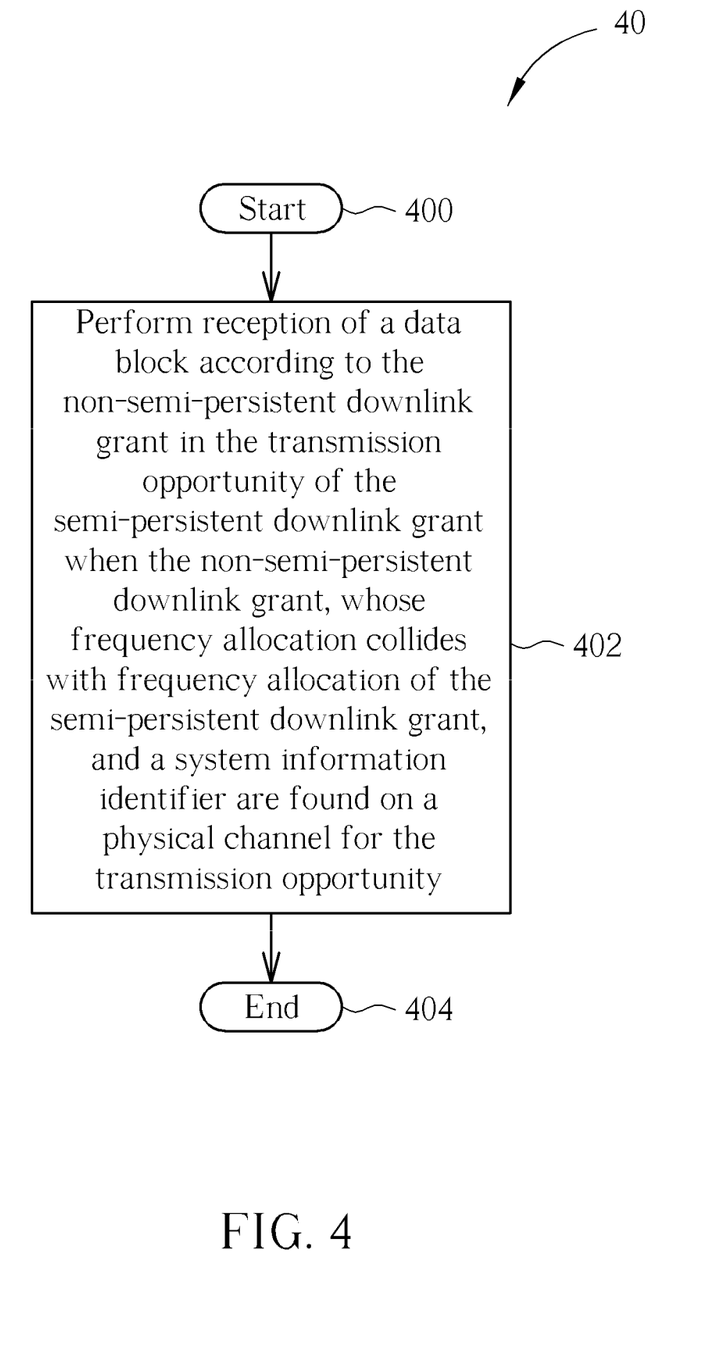
FIG. 4 is a flowchart of a process according to an embodiment of the present invention.

Please refer to FIG. 4, which illustrates a flowchart of a process 40 according to an embodiment of the present invention. The process 40 utilized for performing data transmission corresponding to semi-persistent downlink resources for a UE of a wireless communication system. The process 40 can be compiled into the program code 214 of the storage data 212 and includes the following steps:

Step 400: Start.

Step 402: Perform reception of a data block according to the non-semi-persistent downlink grant in the transmission opportunity of the semi-persistent downlink grant when the non-semi-persistent downlink grant, whose frequency allocation collides with frequency allocation of the semi-persistent downlink grant, and a system information identifier are found on a physical channel for the transmission opportunity.

Step 404: End.

According to the process 40, the UE receives the data block according to the non-semi-persistent downlink grant (e.g. the downlink grant) in the transmission opportunity (e.g. a TTI or a subframe) of the semi-persistent downlink grant when the non-semi-persistent downlink grant, whose frequency allocation collides with the frequency allocation of the semi-persistent downlink grant, and a system information identifier (e.g. SI-RNTI) are found on the physical channel (e.g. PDCCH) for the transmission opportunity.

The process 40 can resolve the problems of the issue 2 of the prior art. In the sub-frame where the UE has a semi-persistent downlink grant, when the eNB allocates this sub-frame to transmit the system information, the UE finds a downlink grant and an SI-RNTI. When the found downlink grant collides with the semi-persistent downlink resources in frequency allocation, the UE decodes this sub-frame according to the downlink grant. Thus, the system information can be decoded successfully.

Figure 5:
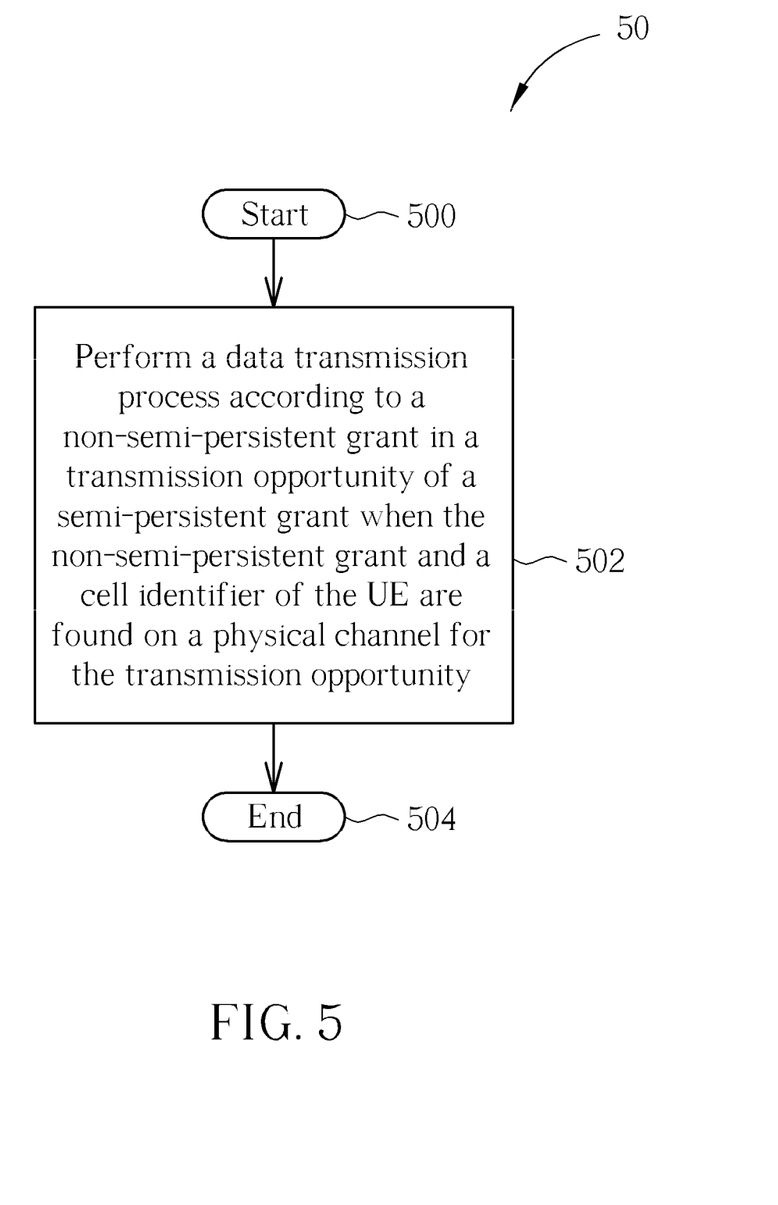
FIG. 5 is a flowchart of a process according to an embodiment of the present invention.

Please refer to FIG. 5, which illustrates a flowchart of a process 50 according to an embodiment of the present invention. The process 50 is utilized for performing data transmission corresponding to semi-persistent resources for a UE of a wireless communication system. The process 50 can be compiled into the program code 214 of the storage data 212 and includes the following steps:

Step 500: Start.

Step 502: Perform a data transmission process according to a non-semi-persistent grant in a transmission opportunity of a semi-persistent grant when the non-semi-persistent grant and a cell identifier of the UE are found on a physical channel for the transmission opportunity.

Step 504: End.

In the process 50, the data transmission process, the semi-persistent grant, and the non-semi-persistent grant correspond to the same communications link, such as uplink or downlink. According to the process 50, the UE performs the data transmission process (e.g. reception of a data block for downlink or a new transmission for uplink) according to the non-semi-persistent grant (e.g. a downlink or uplink grant) in the transmission opportunity (e.g. a TTI or a subframe) of the semi-persistent grant (e.g. a semi-persistent downlink or uplink grant) when the non-semi-persistent grant and a cell identifier (e.g. C-RNTI) of the UE are found on the physical channel (e.g. PDCCH) for the transmission opportunity.

For the process 50 applied to downlink transmission, when the UE finds the C-RNTI of the UE and a downlink grant on the PDCCH for a TTI where the UE has a semi-persistent downlink grant, the PDCCH allocation overrides the semi-persistent allocation for that TTI, and the UE receives a data block in the TTI according to the downlink grant. Furthermore, when the downlink grant found on the PDCCH is addressed to an SPS hybrid automatic repeat request (HARQ) process, the UE determines that the data block is a new data block by clearing a soft buffer of the SPS HARQ process in advance of receiving the data block.

The downlink grant can include a new data indicator (NDI) that is set to 0 or 1. An alternative to clear the soft buffer of the SPS HARQ process is that the UE performs soft combination of the received data block and data in the soft buffer of the SPS HARQ process to decode the data block when the received NDI is set to 1. In this situation, the UE considers the received data block as a retransmission.

For the process 50 applied to uplink transmission, when the UE finds the C-RNTI of the UE and an uplink grant on the PDCCH for a TTI where the UE has a semi-persistent uplink grant, the transmission/retransmission of the UE in the TTI follows the uplink grant instead of the semi-persistent grant.

The uplink grant can also include a NDI that is set to 0 or 1. In this situation, the UE can always transmit a new data block without considering the NDI value. An alternative is that the UE retransmits a data block according to the uplink grant when the received NDI is set to 1.

Figure 6:
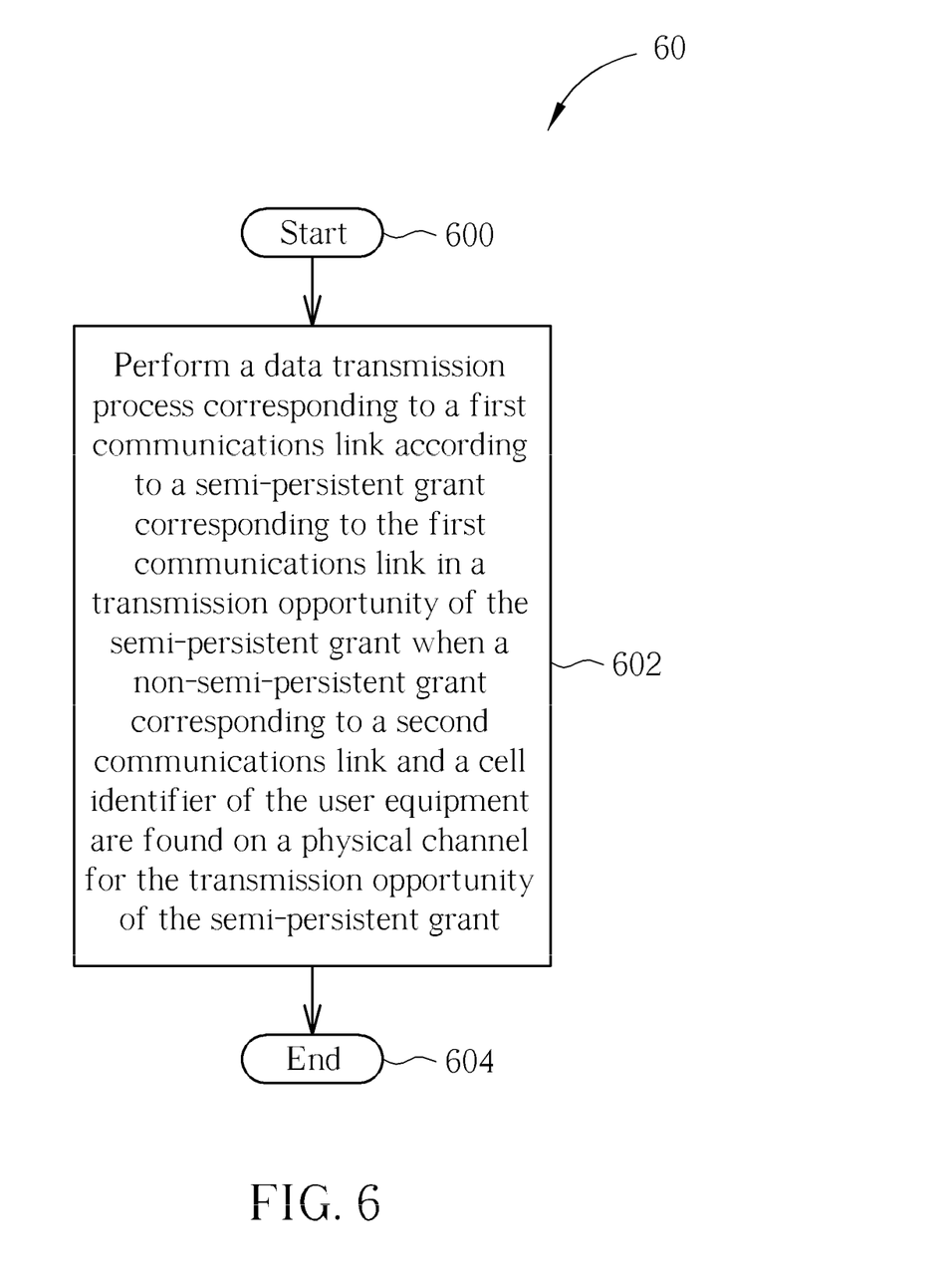
FIG. 6 is a flowchart of a process according to an embodiment of the present invention.

Please refer to FIG. 6, which illustrates a flowchart of a process 60 according to an embodiment of the present invention. The process 60 is utilized for performing data transmission corresponding to semi-persistent resources for a UE of a wireless communication system. The process 60 can be compiled into the program code 214 of the storage data 212 and includes the following steps:

Step 600: Start.

Step 602: Perform a data transmission process corresponding to a first communications link according to a semi-persistent grant corresponding to the first communications link in a transmission opportunity of the semi-persistent grant when a non-semi-persistent grant corresponding to a second communications link and a cell identifier of the user equipment are found on a physical channel for the transmission opportunity of the semi-persistent grant.

Step 604: End.

According to the process 60, the UE performs the data transmission process according to the semi-persistent grant in a transmission opportunity of the semi-persistent grant when the non-semi-persistent grant and the cell identifier of the UE are found on the physical channel for the transmission opportunity. In the process 60, the data transmission process and the semi-persistent grant correspond to the first communications link, whereas the non-semi-persistent grant corresponding to the second communications link. In other words, the process 60 controls the UE to perform the data transmission process according to the semi-persistent grant when the communications link of the found non-semi-persistent grant is different from that of the semi-persistent grant.

In a scenario where the first and second communications links are a downlink and an uplink respectively, the UE receives a data block in a TTI, where the UE has a semi-persistent downlink grant, according to the semi-persistent downlink grant when the UE finds the C-RNTI of the UE and an uplink grant on the PDCCH for the TTI. A similar operation is applied to a scenario where the first and second communications links are an uplink and a downlink respectively.

Thus, the process 60 can resolve the problems of the issues 3 and 5 of the prior art. Taking the solution to the issue 3 for example, when the UE finds its C-RNTI on the PDCCH for uplink resource assignment for dynamic scheduling, the UE decodes the semi-persistent resources instead of decoding the PDSCH with the PDCCH allocation in a sub-frame where the UE has semi-persistent downlink resources. Thus, PDCCH allocation for uplink is not misused for downlink.

In conclusion, the UE in the embodiments of the present invention makes use of a semi-persistent grant or a non-semi-persistent grant to perform related data transmission according to the cell identifier, the system information identifier, the non-semi-persistent grant, or the communication link of the non-semi-persistent grant. Thus, the embodiments of the present invention can prevent the semi-persistent function from being misused in a wrong transmission opportunity or a wrong communications link.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing data transmission corresponding to semi-persistent resources for a user equipment of a wireless communication system, the method comprising:

performing a data reception process in a transmission opportunity according to a semi-persistent downlink grant for the transmission opportunity when no non-semi-persistent downlink grant for the transmission opportunity is found on a physical channel; and when a non-semi-persistent downlink grant and a cell identifier of the user equipment are found on the physical channel and the non-semi-persistent downlink grant is addressed to a semi-persistent scheduling (SPS) hybrid automatic repeat request (HARQ) process, determining that the data reception process is for receiving new data and performing the data reception process in the transmission opportunity according to the non-semi-persistent downlink grant.

2. The method of claim 1 further comprising performing the data reception process in the transmission opportunity according to the semi-persistent downlink grant for a transmission opportunity when none of a non-semi-persistent downlink grant, a cell identifier of the user equipment, and a semi-persistent scheduling cell identifier of the user equipment is found on a physical channel.

3. The method of claim 1 further comprising stopping the data reception process in the transmission opportunity when a non-semi-persistent downlink grant whose frequency allocation collides with frequency allocation of the semi-persistent downlink grant is found and a cell identifier and a semi-persistent scheduling identifier for the user equipment are not found on the physical channel.

4. The method of claim 1 further comprising performing the data reception process in the transmission opportunity according to a non-semi-persistent downlink grant for the transmission opportunity when the non-semi-persistent downlink grant, whose frequency allocation collides with frequency allocation of the semi-persistent downlink grant, and a system information identifier are found on the physical channel.

5. The method of claim 1 further comprising clearing a soft buffer of the SPS HARQ process in advance of receiving new data.

6. The method of claim 1, wherein the non-semi-persistent downlink grant comprises a new data indicator that is set to 0 or 1.

7. The method of claim 1, wherein the transmission opportunity is a transmission time interval or a sub-frame used in a physical layer of the wireless communication system.

8. A method of performing data transmission corresponding to semi-persistent resources for a user equipment of a wireless communication system, the method comprising:

performing a data reception process in a transmission opportunity according to a semi-persistent downlink grant for the transmission opportunity when a non-semi-persistent uplink grant for the opportunity and a cell identifier of the user equipment are found on a physical channel; and when a non-semi-persistent downlink grant and a cell identifier of the user equipment are found on the physical channel and the non-semi-persistent downlink grant is addressed to a semi-persistent scheduling (SPS) hybrid automatic repeat request (HARQ) process, determining that the data reception process is for receiving new data and performing the data reception process in the transmission opportunity according to the non-semi-persistent downlink grant.

9. The method of claim 8, wherein the transmission opportunity is a transmission time interval or a sub-frame used in a physical layer of the wireless communication system.

10. A method of performing data transmission corresponding to semi-persistent resources for a user equipment of a wireless communication system, the method comprising:

performing a data transmission process in a transmission opportunity according to a semi-persistent uplink grant for the transmission opportunity when no non-semi-persistent uplink grant for the transmission opportunity is found on a physical channel; and when a non-semi-persistent uplink grant and a cell identifier of the user equipment are found on the physical channel and the non-semi-persistent uplink grant is addressed to a semi-persistent scheduling (SPS) hybrid automatic repeat request (HARQ) process, determining that the data transmission process is for transmitting new data and performing the data transmission process in the transmission opportunity according to the non-semi-persistent uplink grant.

11. The method of claim 10 further comprising performing the data transmission process in the transmission opportunity according to the semi-persistent uplink grant for a transmission opportunity when none of a non-semi-persistent uplink grant, a cell identifier of the user equipment, and a semi-persistent scheduling cell identifier of the user equipment is found on a physical channel.

12. The method of claim 10 further comprising: stopping the data transmission process in the transmission opportunity when a non-semi-persistent uplink grant whose frequency allocation collides with frequency allocation of the semi-persistent uplink grant is found and a cell identifier and a semi-persistent scheduling identifier for the user equipment are not found on the physical channel.

13. The method of claim 10, wherein the non-semi-persistent uplink grant comprises a new data indicator that is set to 0 or 1.

14. The method of claim 10, wherein the data transmission process is retransmitting a data block according to the non-semi-persistent uplink grant when the non-semi-persistent uplink grant comprises a new data indicator that is set to 1.

15. The method of claim 10, wherein the transmission opportunity is a transmission time interval or a sub-frame used in a physical layer of the wireless communication system.

16. A method of performing data transmission corresponding to semi-persistent resources for a user equipment of a wireless communication system, the method comprising:

performing a data transmission process in a transmission opportunity according to a semi-persistent uplink grant for the transmission opportunity when a non-semi-persistent downlink grant for the opportunity and a cell identifier of the user equipment are found on a physical channel; and when a non-semi-persistent uplink grant and a cell identifier of the user equipment are found on the physical channel and the non-semi-persistent uplink grant is addressed to a semi-persistent scheduling (SPS) hybrid automatic repeat request (HARQ) process, determining that the data transmission process is for transmitting new data and performing the data transmission process in the transmission opportunity according to the non-semi-persistent uplink grant.

17. The method of claim 16, wherein the transmission opportunity is a transmission time interval or a sub-frame used in a physical layer of the wireless communication system.

* * * * *